United States Patent [19]
Tabata et al.

[11] Patent Number: 5,599,085
[45] Date of Patent: Feb. 4, 1997

[54] MOTORCYCLE HEADLIGHT AND METHOD FOR CONTROLLING A LIGHT DISTRIBUTION THEREOF

[75] Inventors: Hajime Tabata, Wakoh; Tetsuya Suzuki, Kawagoe; Yoshihisa Hirose, Tokorozawa; Koichi Nagano, Tokyo; Masaaki Furubayashi, Tokyo; Tadashi Nomura, Tokyo, all of Japan

[73] Assignees: Honda Giken Kogyo Kabushiki Kaisha; Stanley Electric Co., Ltd., both of Tokyo, Japan

[21] Appl. No.: 363,740

[22] Filed: Dec. 23, 1994

[30] Foreign Application Priority Data

Dec. 29, 1993 [JP] Japan .................................. 5-355456

[51] Int. Cl.⁶ .................................................. F21M 3/18
[52] U.S. Cl. .............................. 362/72; 362/66; 362/233; 362/276; 362/297; 362/346; 362/428
[58] Field of Search ............................ 362/66, 70, 71, 362/72, 233, 250, 276, 297, 346, 428

[56] References Cited

U.S. PATENT DOCUMENTS

| | | | |
|---|---|---|---|
| 3,939,339 | 2/1976 | Alphen | 362/72 |
| 4,539,627 | 9/1985 | Ogishima | 362/72 |
| 4,704,661 | 11/1987 | Kosmatka | 362/346 |
| 4,833,573 | 5/1989 | Miyauchi et al. | 362/72 |

FOREIGN PATENT DOCUMENTS

| | | | |
|---|---|---|---|
| 1124018 | 10/1956 | France. | |
| 64803 | 3/1991 | Japan | 362/72 |
| 4331678 | 11/1992 | Japan. | |

*Primary Examiner*—Ira S. Lazarus
*Assistant Examiner*—Sara Sachie Raab
*Attorney, Agent, or Firm*—Weingarten, Schurgin, Gagnebin & Hayes LLP

[57] ABSTRACT

An inventive headlight and a method for controlling a light distribution of the headlight of a motorcycle effectively eliminating the problem of a deteriorated light distribution pattern of a conventional headlight that becomes apparent typically when the motorcycle is tilted to maneuver the motorcycle along a curved road. A headlight 1 comprises a mirror reflector 3 divided into an upper left movable section 32, an upper right movable section 33 provided with respective pivots 32a and 33a. When the motorcycle is tilted, the tilted or lowered one of the movable sections 32 and 33 is driven to turn upward by a corresponding solenoid type driving unit 5 according to a tilt sensor 22 to face the forward of the moving motorcycle and produce a light 5 distribution pattern aligned with the direction along which the motorcycle moves so that any possible deterioration in the light distribution pattern can be effectively corrected.

29 Claims, 8 Drawing Sheets

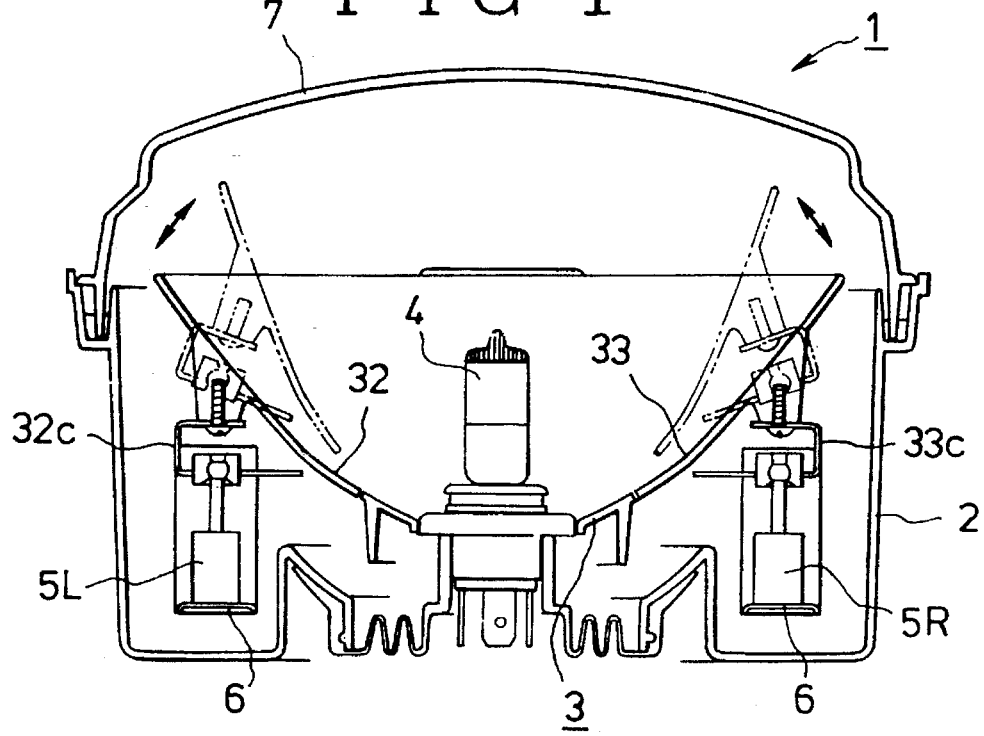
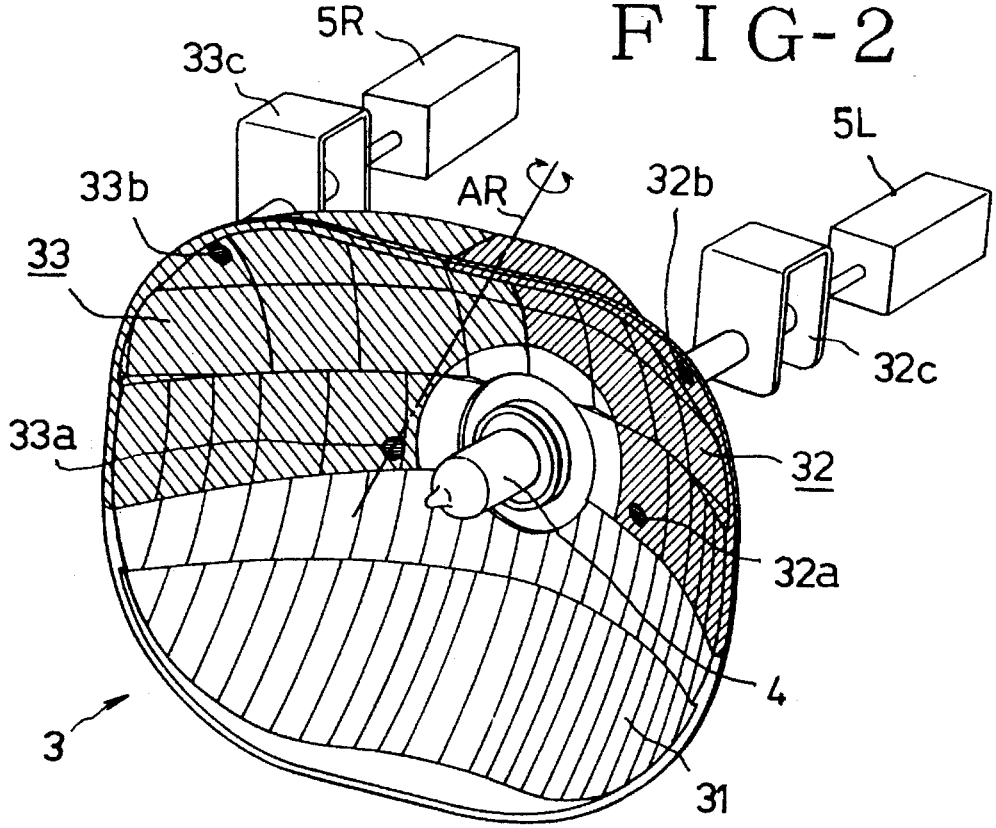

MOTORCYCLE HEADLIGHT AND METHOD FOR CONTROLLING A LIGHT DISTRIBUTION THEREOF

BACKGROUND OF THE INVENTION

1. Field of the Invention

This invention relates to a headlight of a motor vehicle and to a method for controlling a light distribution thereof, more particularly, it relates to a headlight that automatically corrects its light distribution pattern to compensate the effect of inclination of the vehicle main body that may appear when the vehicle is turning its direction and relates to a method for controlling the light distribution. Thus, a headlight according to the invention is particularly suited for use on a motorcycle.

2. Background Art

FIG. 13 of the accompanying drawings illustrates a conventional motorcycle headlight. The headlight 200 comprises a housing 201 that contains a light source 202, a mirror reflector 203 having a focus where the light source is arranged and provided with an aiming device 203 for adjusting the lighting direction of the headlight and a lens 204 disposed at the front aperture of the housing 201. A headlight 200 having a constitution as described above is secured to the body 21 of a motorcycle at stays 201a, 201a of the housing 201 by appropriate means such as screw bolts.

The mirror reflector 203 can positionally be adjusted relative to the housing 201 by the aiming device 203a in order to correct the lighting direction only within a very limited range and therefore such a device is normally used to correct any directional errors of the headlight that may exist if the headlight is inappropriately fitted to the main body. Additionally, such adjustment requires the use of a tool and hence cannot be carried out while the vehicle is moving.

The motorcycle turns along a curved road, tilting its body 21. Thus, if the motorcycle turns left, the conventional headlight 200 rigidly secured to the body 21 of the motorcycle is also tilted leftward with the body to show a light distribution pattern D indicated by solid line in FIGS. 14 and 15, which is particularly ineffective to illuminate the vitally important left half of the view to be seen by the driver.

Therefore, it is an object of the present invention to provide a headlight of a motorcycle that can automatically correct its light distribution pattern to compensate the effect of inclination of the main body that may appear when the motorcycle is turning its direction and a method for controlling a light distribution thereof.

SUMMARY OF THE INVENTION

According to the invention, the above object and other objects of the invention are achieved by providing a headlight comprising a mirror reflector and designed to be rigidly secured to a motorcycle to form an integral component thereof, characterized in that said mirror reflector is provided with a pivot disposed substantially along its vertical center line so that, if the motorcycle is tilted to either side, the mirror reflector is turned toward the side of the tilt around an axis of rotation that is inclined from the vertical axis of the mirror reflector in upright position and becomes vertical as the motorcycle is tilted, and further by providing a method for controlling a light distribution of the headlight. With a headlight having such a constitution, the light distribution pattern of the headlight that may be deteriorated when the motorcycle is tilted is satisfactorily corrected to make it aligned with the direction of the driver's view.

BRIEF DESCRIPTION OF THE DRAWINGS

FIG. 1 is a schematic sectional plan view of a first embodiment of motorcycle headlight according to the invention.

FIG. 2 is a partially exploded perspective rear view of the embodiment of FIG. 1, showing only a principal part thereof.

DETAILED DESCRIPTION OF THE PREFERRED EMBODIMENTS

Now, the invention will be described in greater detail by referring to FIGS. 1 through 12 of the accompanying drawings that illustrate preferred embodiments of the invention.

Figure 13:
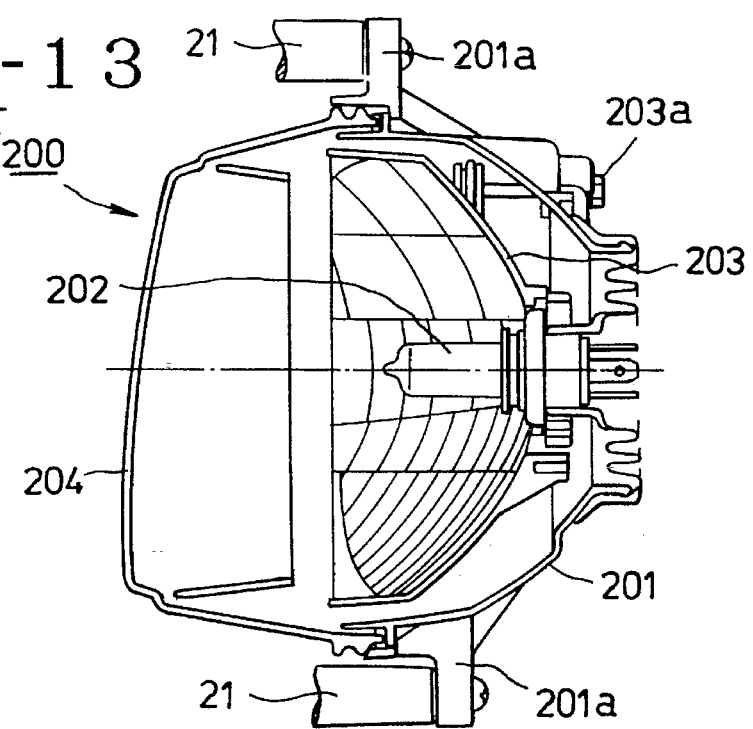
FIG. 13 is a schematic sectional side view of a conventional motorcycle headlight.
Figure 14:
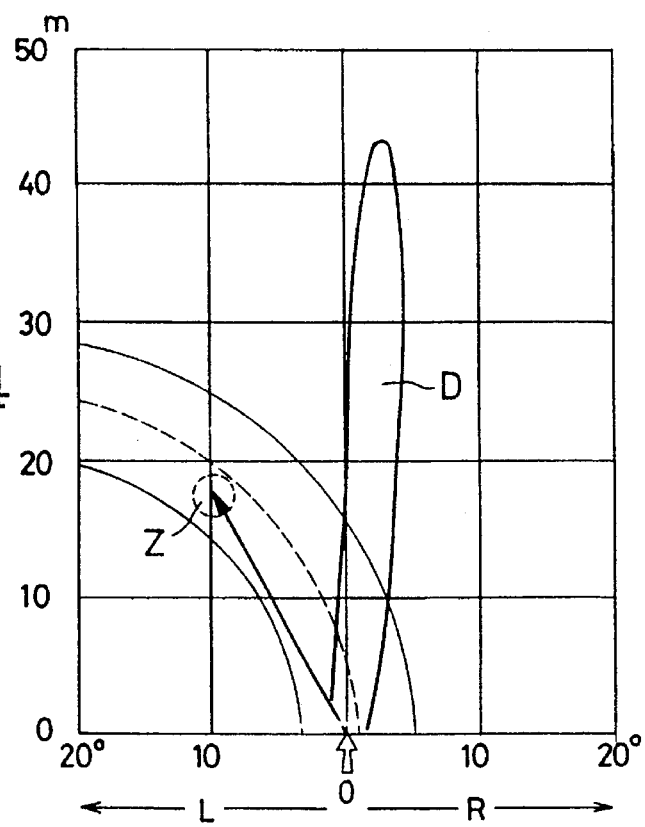
FIG. 14 is a graph showing a light distribution pattern of the conventional headlight of FIG. 13.
Figure 15:
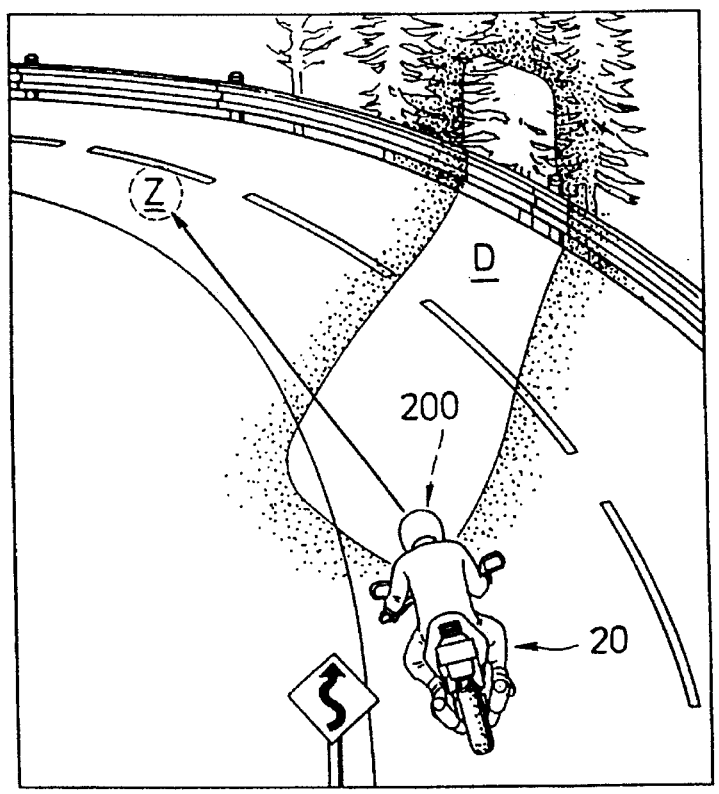
FIG. 15 is a schematic perspective view of a scene where a motorcycle provided with a conventional headlight is moving along a curved road.

Referring firstly to FIG. 1 showing a first embodiment of motorcycle headlight of the invention, the headlight is generally denoted by reference numeral 1 and comprises a housing 2 which is secured to the main body 21 (not shown: See FIG. 13.) of a motorcycle by appropriate means such as screw bolts. Therefore, the headlight 1 is tilted along with the housing 2 and mirror reflector 3 as the motorcycle main body is tilted when the motorcycle is moving along a curved road as in the case of a conventional headlight.

However, a headlight according to the invention corrects a deteriorated forward view, if any, that may occur when the headlight 1 is tilted with the body of the motorcycle as part or all of the mirror reflector 3 pivots to compensate the tilt of the body. In this embodiment, the mirror reflector 3 is divided into sections, movable sections and a fixed section, so that the deteriorated view is corrected by movable sections.

Note that expressions pertaining to directions such as left, right, forward and backward are used herein from the driver's point of view. As described above and specifically shown in FIG. 2, the mirror reflector 3 is divided into three sections or a lower fixed section 31, an upper left movable section 32 and an upper right movable section 33 with a light source 4 located substantially at the center of the mirror reflector 3.

The left and right movable sections 32 and 33 are symmetrically arranged. The right movable section 33 has a pivot 33a located close to the center of the mirror reflector and arranged along axis AR that is inclined leftward relative to verticality by an appropriate angle so that the section 33 is pivotable around the pivot 33a.

The right movable section 33 is connected at a point close to the upper right corner thereof with a drive mechanism such as a solenoid type driving unit 5R. As the drive mechanism, or solenoid type driving unit 5R is operated, it shifts the contact point 33b of the solenoid type driving unit 5R and the right movable section 33 forwardly to turn the right movable section 33 leftward around the pivot 33a. As a combined effect of the pivot 33a that is inclined leftward and the forward movement of the right movable section 33, the latter is also turned downward by a given angle.

The left movable section 32 which is similar to the right movable section 33 has a pivot 32a located close to the center of the mirror reflector 3 and arranged along axis AL (not shown in FIG. 2) that is inclined rightward relative to verticality. The section 32 is connected at a contact point 32b close to the upper left corner thereof with a solenoid type driving unit 5L. Thus, the left movable section 32 operates in a similar but symmetrically manner relative to the right movable section 33.

The mirror reflector 3 having a constitution as described above is contained in the housing 2. More specifically, the housing 2 is provided with an aiming system comprising the solenoid type driving units 5L and 5R and the mirror reflector 3 is fitted to the housing 2 by means of substrates 6, 6 (FIG. 1) so that the mirror reflector 3 can aim at the proper front view regardless of the position and movement of the solenoid type driving units 5L and 5R.

The front aperture of the housing 2 is covered by a lens 7 that intensifies the rays of light emitted from headlight 1. As the movable sections 32 and 33 circularly rotate around the respective pivots 32a and 33a whereas the solenoid type driving units 5L and 5R move linearly along their respective axes, discrepancy may arise between the movement of the solenoid type driving units and that of the movable sections when they are operated simultaneously to generate tension within them. Therefore, they are preferably connected with each other with respective brackets 32c, 33c disposed therebetween in order to absorb any tension that may be given rise to.

Figure 3:
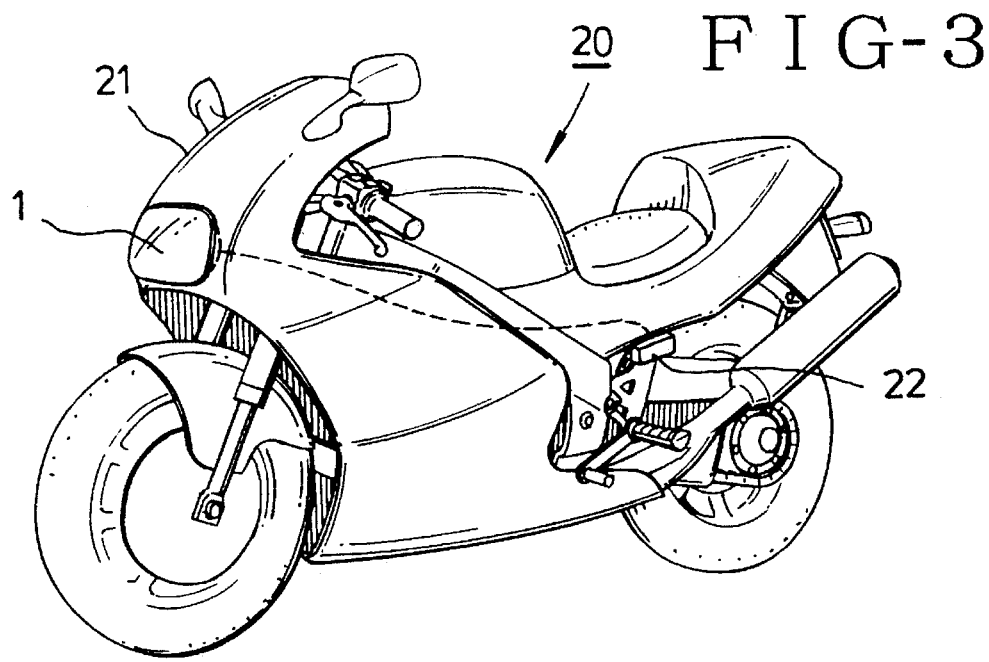
FIG. 3 is a schematic isometric view of a motorcycle provided with a headlight according to the invention.

FIG. 3 shows a schematic isometric view of a motorcycle 20 equipped with a headlight 1 according to the invention. The headlight 1 is normally fitted to a cowl of the main body 21 of the motorcycle which is provided with a sensor 22 for detecting an inclined condition of the main body 21. If it detects that the main body 21 is tilted leftward, it causes the right solenoid type driving unit 5R to drive the right movable section 33 to act responsively whereas, if it detects any rightward tilt, it causes the left solenoid type driving unit 5L to show a responding action.

Figure 4:
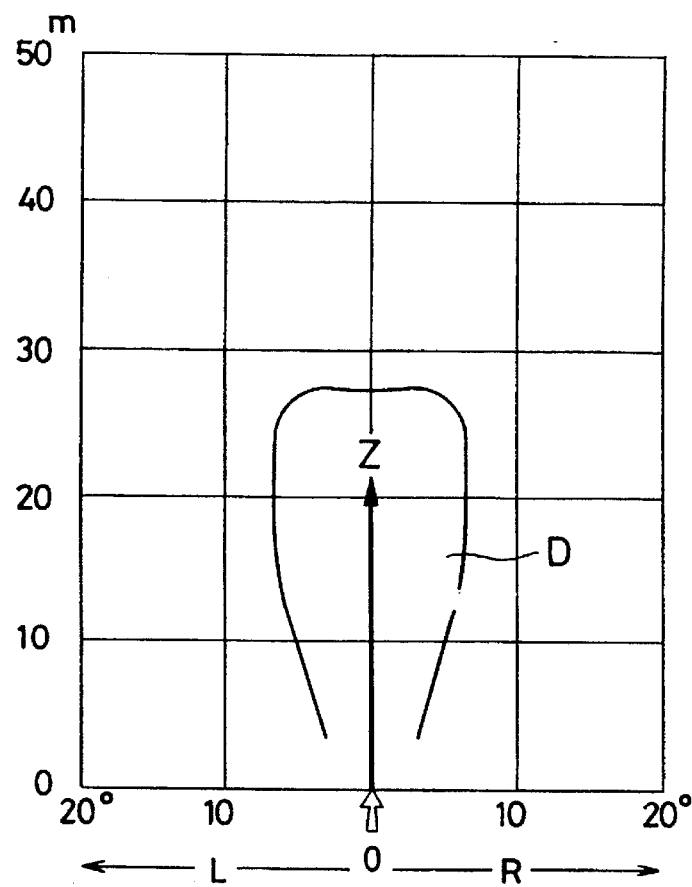
FIG. 4 is a graph showing a light distribution pattern of the embodiment of FIG. 1 when the motorcycle is moving on a straight road, wherein the spindle of the graph shows a deviation of a distance (meter) from the motorcycle, and the cross axis of the graph shows a deviation of an angle (°) from the perpendicular plane which includes the lamp axis.

The function and effects of a headlight 1 according to the invention will now be described. As long as the main body 21 is held to upright position, the tilt sensor 22 does not produce any output signal to drive the solenoid type driving units 5L and 5R to operate so that the fixed section 31 and the left and right movable sections 32 and 33 of the mirror reflector 3 are held in respective normal positions and the headlight 1 projects forward light with a symmetrical light distribution pattern D as shown in FIG. 4 to optimally benefit the driver.

When the main body 21 of the motorcycle 20 is tilted left as it turns leftward, the tilt sensor 22 drives the solenoid type driving unit 5R to move forward and pivot the right movable section 33 left and downward so that the rays of light coming from the light source 4 and reflected by the right movable section 33 are also turned to the same direction.

Under this condition, although the headlight 1 is tilted leftward as a whole with the lowered left side and the raised right side, the pivoting movement of the right movable section 33 corrects the tilt and the rays of light reflected by the right movable section 33 are directed leftward as a substantially horizontal flux of light.

Figure 5:
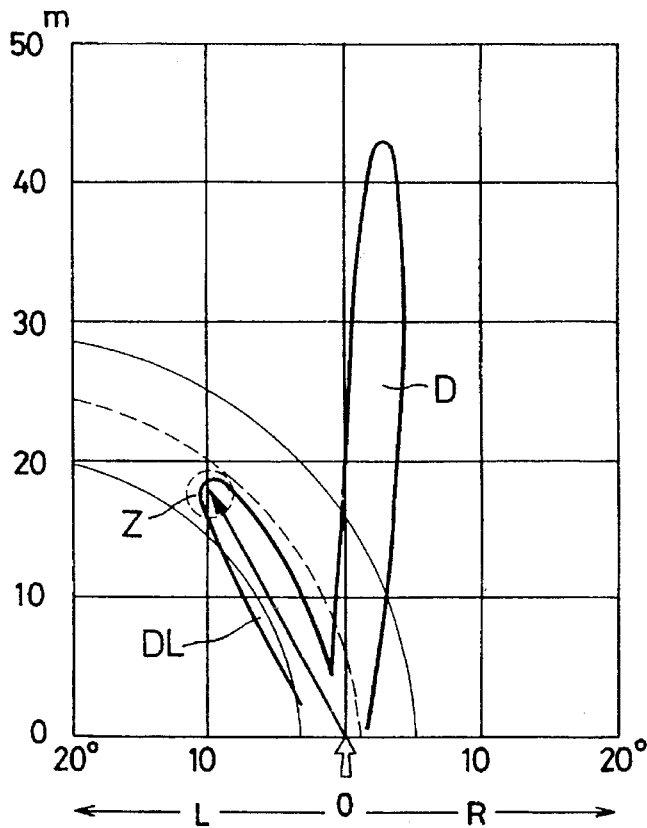
FIG. 5 is a graph similar to FIG. 4 but showing a light distribution pattern when the motorcycle is turning along a curved road.
Figure 6:
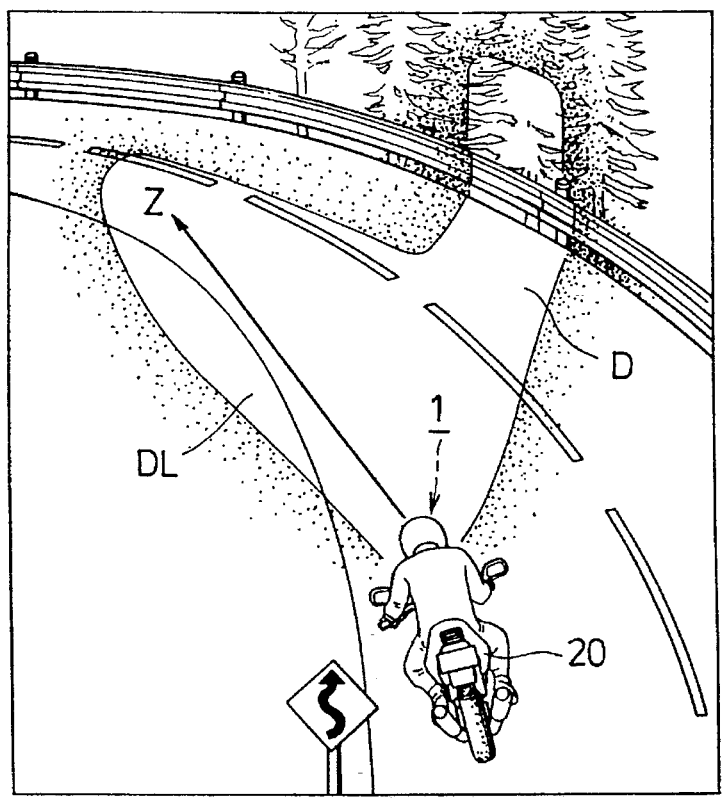
FIG. 6 is a schematic perspective view of a scene where a motorcycle provided with a headlight according to the invention is moving along a curved road.

FIG. 5 shows a light distribution pattern D corrected by the operation of the right movable section 33 and having a left branched component DL produced by the right movable section 33 and substantially aligned with the viewing direction Z of the driver. FIG. 6 is a schematic perspective view of a scene where a headlight according to the invention is operating in a manner as described above.

Figure 7:
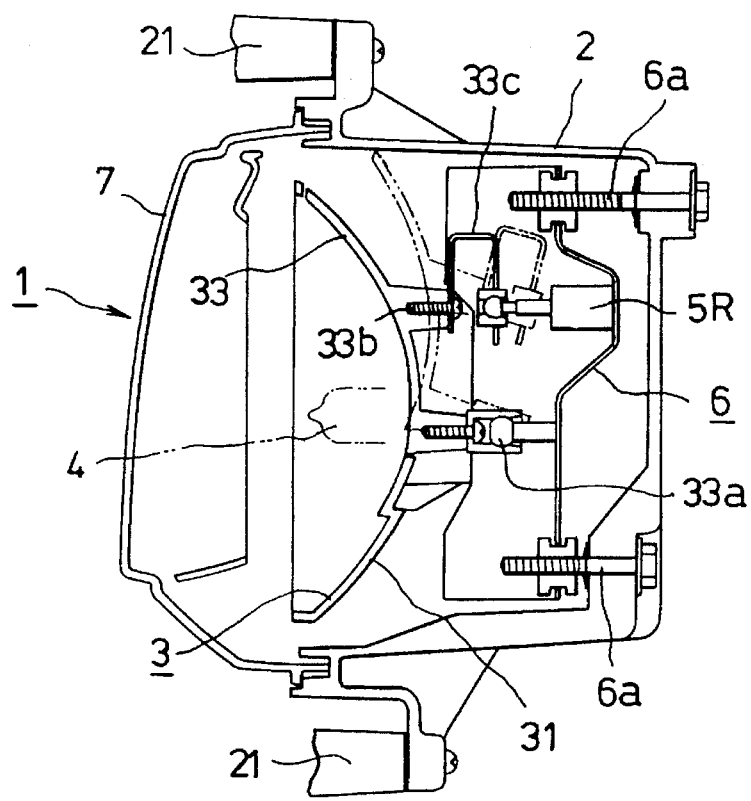
FIG. 7 is a schematic sectional side view of a second embodiment of motorcycle headlight according to the invention.

Some of the characteristic features of the present invention will be discussed by referring to FIG. 7 illustrating a second embodiment of the invention in vertical cross section. Note that the components of the embodiment that are same as or similar to those of the first embodiment are respectively denoted by same reference symbols. Assume now that the contact point 33b of the right movable section 33 is moved backward by the solenoid type driving unit 5R in stead of the forward movement of the first embodiment. Then, the right movable section 33 is turned right and upward to direct reflected rays of light into that direction.

If the main body 21 is tilted rightward under this condition, the right movable section 33 is lowered so that consequently it produces a substantially horizontal flux of light that is directed rightward. Thus, with this second embodiment of the invention, the net result is same as that of the first embodiment in the above description, where the contact point 32b of the left movable section 32 is moved forward by the solenoid type driving unit 5L when the headlight 1 is tilted rightward.

Thus, with a headlight 1 according to the invention, the light distribution pattern of the headlight deteriorated by a tilt of the main body 21 is corrected by turning the right or left movable section 32 or 33 toward the tilted side.

Figure 8:
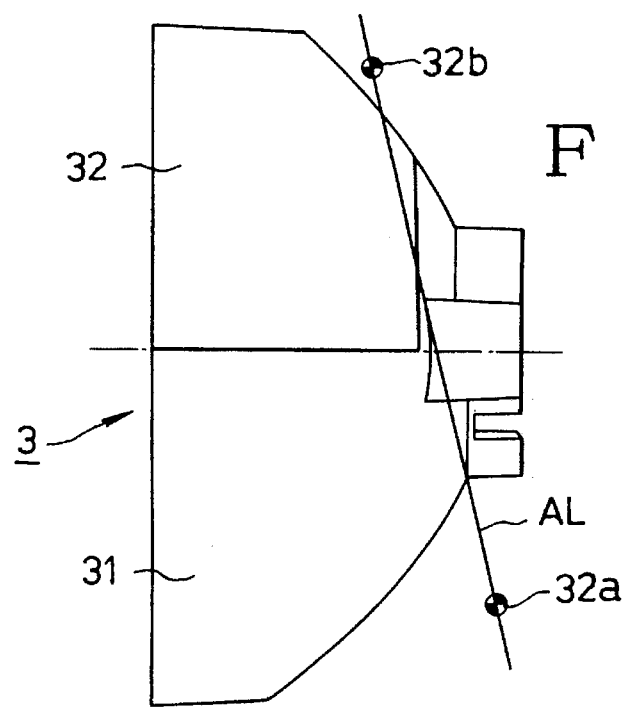
FIG. 8 is a schematic side view of a third embodiment of motorcycle headlight according to the invention.

FIG. 8 shows a third embodiment of the invention. While the pivots 32a and 33a of the left and right movable sections 32 and 33 of either of the preceding embodiments are arranged along the respective axes AL and AR that are inclined right and left respectively, the axis AL of the pivot 32a of the left movable section 32 being inclined right and that axis AL of the pivot 33a of the right movable section 33 being inclined left, they may additionally be inclined forward or rearward as in the case of the third embodiment. The axis AL of the pivot 32a of the left movable section 32 of this third embodiment is inclined right and forward as shown in FIG. 8. It will be understood that the axis AR of the pivot 33a of the right movable section 33 has a similar forward inclination.

With such an arrangement, the ratio of the angle of leftward rotation to that of downward (or upward) inclination of the right solenoid type driving unit 5R, for instance, can be made variable so that an optimum value may be selected for the ratio on the basis of collected data on the motorcycle 20 for which the headlight 1 is used.

If the mirror reflector 3 is paraboloidal in the normal position and the paraboloid is distorted as the movable sections are pivoted to partly damage the effect of a paraboloidal reflector, the benefit of the present invention of using pivotable sections more than offsets the disadvantage of the distorted paraboloid.

Particularly, in view of the fact that the light distribution effect of currently available paraboloidal mirror reflectors relies mainly on the diffusion effect of an elaborately cut lens 7, it will be understood that the diffusion effect of such a cut lens 7 is remarkably reduced when the headlight 1 is tilted left or right because the lens is also tilted to turn the distribution pattern sideways.

To the contrary, the mirror reflector 3 of a headlight 1 according to the invention comprises a plurality of planes to form a multi-reflector (FIG. 2) that produces composite rays of reflected light so that the use of an elaborately cut lens 7 is not necessary.

Figure 9:
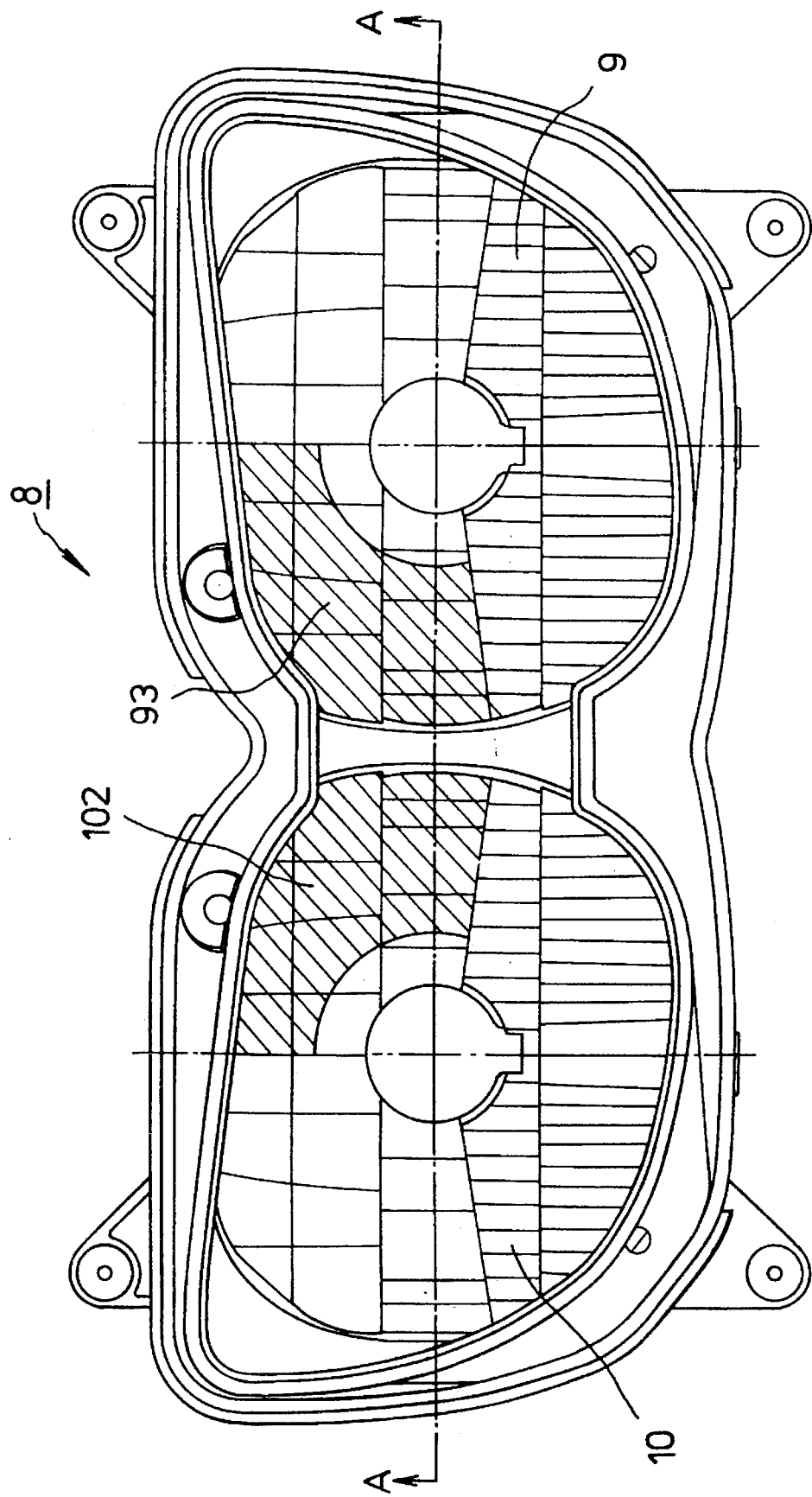
FIG. 9 is a schematic front view of a fourth embodiment of motorcycle headlight according to the invention.
Figure 10:
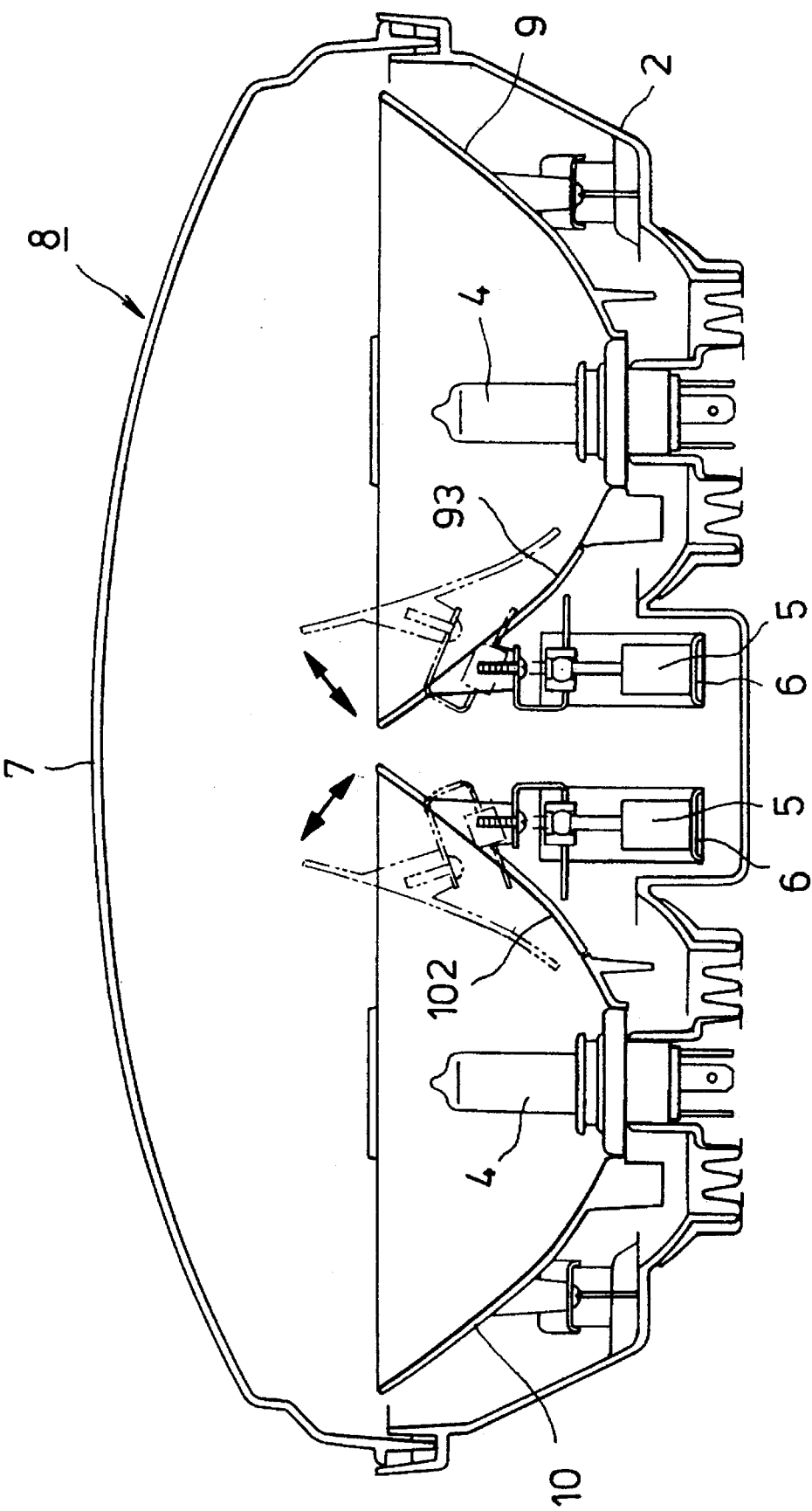
FIG. 10 is a sectional view taken along line A—A in FIG. 9.

FIGS. 9 and 10 show a fourth embodiment of the invention, which is in fact a double light system of headlight 8 comprising a pair of mirror reflectors 9 and 10, a system becoming increasingly popular for motorcycles.

While each of the two mirror reflectors 9 and 10 of such a double light system may comprise a left movable section and a right movable section as in the case of the first and second embodiments, it is preferably for the purpose of simplicity that leftwardly and rightwardly movable sections are arranged in respective mirror reflectors. The fourth embodiment has such a constitution, where the left mirror reflector 9 comprises a rightwardly movable section 93 and the right mirror reflector 10 comprises a leftwardly movable section 102.

Conversely, the left mirror reflector 9 may comprise a leftwardly movable section and the right mirror reflector 10 may comprise a rightwardly movable section. The contact points of these movable sections may be so arranged as to be moved forward or, alternatively, backward by respective solenoid type driving units 5, 5. Besides, many other structural options may be conceivable.

Figure 11:
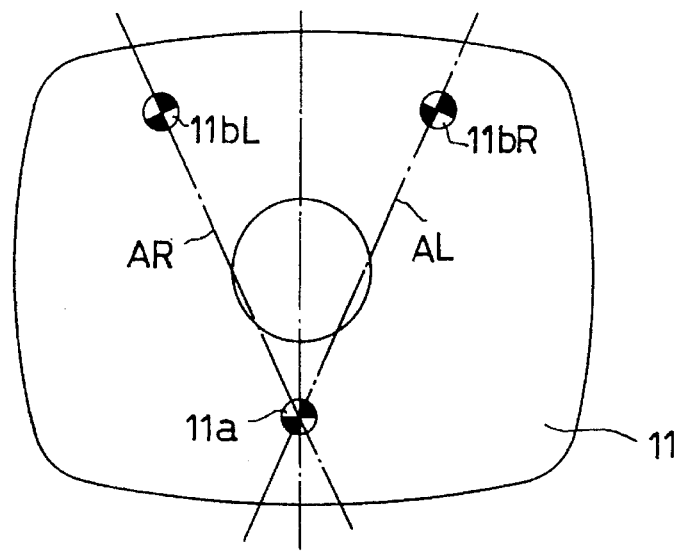
FIG. 11 is a schematic rear view of a fifth embodiment of motorcycle headlight according to the invention, showing only a principal part thereof.

FIG. 11 shows a rear view of a mirror reflector 11 of a fifth embodiment of the invention. While the mirror reflectors of the preceding embodiments are divided into sections including movable ones, the mirror reflector 11 of this embodiment is entirely driven to pivot in response to a tilted condition of the main body 21.

The mirror reflector 11 is provided at a position on the center line with a ball joint 11a that allows the mirror reflector to freely turn in any directions around a pivot and a pair of upper joints or an upper left joint 11bL and an upper right joint 11bR. The upper joints 11bL and 11bR are connected to a drive mechanism, which will be described below.

Figure 12:
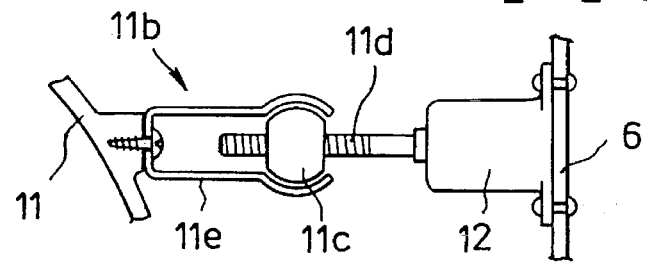
FIG. 12 is a schematic sectional view of the embodiment of FIG. 11.

FIG. 12 shows a drive mechanism to be used for the joints 11bL and 11bR, each comprising a nut 11c having a spherical profile, screw bolt 11d engagedly driven into the nut 11c and a holder 11e having a spherical cavity to receive the nut 11c. The holder 11e is rigidly secured to the mirror reflector 11 whereas the screw bolt 11d is connected to a substrate 6 by way of a drive mechanism such as a stepping motor 12 (L or R).

With the above described arrangement, the nut 11c is held in normal position on the screw bolt 11d so long as it is not driven to turn by the stepping motor 12(L or R). Under this condition, the joint 11bL or 11bR is not particularly different from the ball joint 11a that operates as a pivot. Thus, under this condition, the mirror reflector 11 supported by three joints projects light straight ahead.

If the nut 11c of the left joint 11bL is retracted by the left stepping motor 12(L), the mirror reflector 11 is turned around an axis AL defined by a line connecting the pivot of the joint 11a and that of the joint 11bR to produce a desired light distribution pattern as in the case of the preceding embodiments.

As described above in detail, a headlight according to the invention comprises a mirror reflector provided with a pivot disposed substantially along its vertical center line so that, if the motorcycle is tilted to either side, the mirror reflector is turned toward the side of the tilt around an axis of rotation that is inclined from the vertical axis of the mirror reflector in upright position and becomes vertical as the motorcycle is tilted. Thus, the headlight produces an upward flux of light toward the tilted side of the motorcycle so that the light distribution pattern of the headlight deteriorated by the tilt is satisfactorily corrected to make it aligned with the direction of the driver's view.

What is claimed is:

1. A headlight of a motorcycle comprising,
   at least one housing secured to the motorcycle and having a front aperture,
   at least one lens covering the front aperture of the housing,
   at least one light source located substantially at a center of the housing,
   at least one mirror reflector comprising at least one movable portion having a pivot, said mirror reflector being installed into the housing,
   at least one driving mechanism for moving the movable portion of the reflector, so that,
   when the motorcycle is tilted, the movable portion of the reflector is turned by the driving mechanism around an axis of rotation that runs through a point where a pivot of the reflector is provided, said axis is inclined from vertical axis of the mirror reflector in upright position and becomes vertical as the motorcycle is tilted so as to obtain an appropriate light distribution of the headlight.

2. A headlight of a motorcycle according to claim 1, wherein the movable portion comprises an upper right half reflector and an upper left half reflector, and the driving mechanism comprises two units for each half reflector.

3. A headlight of a motorcycle according to claim 2, wherein movement of the movable portions is a forward movement.

4. A headlight of a motorcycle according to claim 3, wherein the headlight is a double light type.

5. A headlight of a motorcycle according to claim 2, wherein movement of the movable portions is a backward movement.

6. A headlight of a motorcycle according to claim 5, wherein the headlight is a double light type.

7. A headlight of a motorcycle according to claim 2, wherein the headlight is a double light type.

8. A headlight of a motorcycle according to claim 1, wherein the headlight is a double light type.

9. A headlight of a motorcycle according to claim 1, wherein the mirror reflector or each of the mirror reflectors is a composite reflector comprising a plurality of planes arranged to a produce a desired light distribution pattern so that said headlight is not used with a cut lens.

10. A method for controlling a light distribution of a motorcycle headlight, comprising the steps of:
   providing a headlight rigidly secured to a motorcycle to form an integral component, said headlight comprising a mirror reflector having at least one movable reflector portion and comprising
      an upper right half reflector;
      an upper left half reflector;
      a first drive mechanism attached to said upper right half reflector; and
      a second drive mechanism attached to said upper left half reflector;
   detecting a direction to which the motorcycle is tilted by a tilt sensor; and
   moving the movable reflector of the headlight by at least one driving mechanism according to the detected direction so as to obtain an appropriate light distribution aligned with a viewing direction of a driver;
   wherein movement of the movable reflector is carried out so that the movable reflector is turned around an axis of rotation that runs through a point where a pivot of the reflector is provided, said axis inclined from a vertical with respect to said motorcycle and becomes vertical as the motorcycle is tilted.

11. A method for controlling a light distribution of a motorcycle headlight according to claim 10, wherein the movement of the movable portions is a forward movement.

12. A method for controlling a light distribution of a motorcycle headlight according to claim 11, wherein the headlight is a double light type.

13. A method for controlling a light distribution of a motorcycle headlight according to claim 10, wherein the movement of the movable portions is a backward movement.

14. A method for controlling a light distribution of a motorcycle headlight according to claim 13, wherein the headlight is a double light type.

15. A method for controlling a light distribution of a motorcycle headlight according to claim 10, wherein the headlight is a double light type.

16. A method for controlling a light distribution of a motorcycle headlight according to claim 10, wherein the headlight is a double light type.

17. A headlight for a motorcycle, comprising: a mirror reflector comprising
   a lower fixed section;
   an upper left movable section having a first axis of rotation positioned near a center of said mirror reflector and inclined rightward; and
   an upper right movable section having a second axis of rotation positioned near the center of said mirror reflector and inclined leftward;
   a first drive mechanism attached to said upper left moveable section; and
   a second drive mechanism attached to said upper right moveable section;
   wherein said first drive mechanism moves said upper left moveable section forward around said first axis of rotation when said motorcycle is tilted to the right, and said second drive mechanism moves said upper right moveable section forward around said second axis of rotation when said motorcycle is tilted to the left.

18. A headlight of a motorcycle according to claim 17, wherein the first axis of rotation or the second axis of rotation is inclined forward or backward.

19. A headlight of a motorcycle according to claim 17, wherein the mirror reflector is a composite reflector comprising a plurality of planes arranged to a produce a desired light distribution pattern so that said headlight is not used with a cut lens.

20. A headlight of a motorcycle according to claim 17, wherein the mirror reflector is a composite reflector comprising a plurality of planes arranged to a produce a desired light distribution pattern so that said headlight is not used with a cut lens.

21. A headlight for a motorcycle, comprising:
   a mirror reflector comprising
   a lower fixed section;
   an upper left movable section having a first axis of rotation positioned near a center of said mirror reflector and inclined rightward; and
   an upper right movable section having a second axis of rotation positioned near the center of said mirror reflector and inclined leftward;
   a first drive mechanism attached to said upper left moveable section; and
   a second drive mechanism attached to said upper right moveable section;
   wherein said second drive mechanism moves said upper right moveable section backward around said second axis of rotation when said motorcycle is tilted to the right, and said first drive mechanism moves said upper left moveable section backward around said first axis of rotation when said motorcycle is tilted to the left.

22. A headlight of a motorcycle according to claim 21, wherein said first axis of rotation or said second axis of rotation is inclined forward or backward.

23. A headlight of a motorcycle according to claim 21, wherein the mirror reflector is a composite reflector comprising a plurality of planes arranged to a produce a desired light distribution pattern so that said headlight is not used with a cut lens.

24. A headlight for a motorcycle, comprising:
   a first mirror reflector and a second mirror reflector, said first mirror reflector having a raised position when said motorcycle is tilted to the right, and said second mirror reflector having a raised position when said motorcycle is tilted to the left;
   said first mirror reflector having a leftwardly moveable section, said leftwardly moveable section having a first axis of rotation at a left and slightly upper position proximate a center thereof;
   said second mirror reflector having a rightwardly moveable section, said rightwardly moveable section having a second axis of rotation at a right and slightly upper position proximate the center thereof;
   a first drive mechanism attached to the left upper corner of said leftwardly moveable section;
   a second drive mechanism attached to the right upper corner of said rightwardly moveable section;
   wherein said first drive mechanism moves said first mirror reflector forward when said first mirror reflector is in the raised position, and said second drive mechanism moves said second mirror reflector forward when said second mirror reflector is in the raised position.

25. A headlight of a motorcycle according to claim 24, wherein said first axis of rotation and said second axis of rotation is inclined forward or backward.

26. A headlight of a motorcycle according to claim 24, wherein each of the mirror reflectors is a composite reflector comprising a plurality of planes arranged to a produce a desired light distribution pattern so that said headlight is not used with a cut lens.

27. A headlight for a motorcycle, comprising:
   a first mirror reflector and a second mirror reflector, said first mirror reflector having a lowered position when said motorcycle is tilted to the left, and said second mirror reflector having a lowered position when said motorcycle is tilted to the right;
   said first mirror reflector having a leftwardly moveable section, said leftwardly moveable section having a first axis of rotation at a left and slightly upper position proximate a center thereof;
   said second mirror reflector having a rightwardly moveable section, said rightwardly moveable section having a second axis of rotation at a right and slightly upper position proximate the center thereof;
   a first drive mechanism attached to the left upper corner of said leftwardly moveable section;
   a second drive mechanism attached to the right upper corner of said rightwardly moveable section;
   wherein said first drive mechanism moves said first mirror reflector backward when said first mirror reflector is in the lowered position, and said second drive mechanism moves said second mirror reflector backward when said second mirror reflector is in the lowered position.

28. A headlight of a motorcycle according to claim 27, wherein said first axis of rotation or said second axis of rotation is inclined forward or backward.

29. A headlight of a motorcycle according to claim 27, wherein each of the mirror reflectors is a composite reflector comprising a plurality of planes arranged to a produce a desired light distribution pattern so that said headlight is not used with a cut lens.

* * * * *